(12) United States Patent
Bousfield et al.

(10) Patent No.: US 10,293,935 B2
(45) Date of Patent: May 21, 2019

(54) FLYING VEHICLE RETRACTABLE WING HINGE AND TRUSS

(75) Inventors: Samuel Hall Bousfield, Meadow Vista, CA (US); Robert N. Roberts, Lawrence, KS (US); Matthew A. Brown, Lawrence, KS (US); Willem A. J. Anemaat, Lawrence, KS (US)

(73) Assignee: TUDOR CROSSFELT, LP, Redmond, OR (US)

( * ) Notice: Subject to any disclaimer, the term of this patent is extended or adjusted under 35 U.S.C. 154(b) by 1264 days.

(21) Appl. No.: 13/136,481

(22) Filed: Aug. 2, 2011

(65) Prior Publication Data

US 2012/0032023 A1 Feb. 9, 2012

Related U.S. Application Data

(60) Provisional application No. 61/400,896, filed on Aug. 3, 2010.

(51) Int. Cl.
*B64C 3/56* (2006.01)
*B64C 37/00* (2006.01)

(52) U.S. Cl.
CPC ............... *B64C 37/00* (2013.01); *B64C 3/56* (2013.01)

(58) Field of Classification Search
CPC ........... B64C 3/56; B64C 37/00; B64C 37/02; B64C 3/26; B64C 2001/0072; B64C 2201/102; B64C 39/08; B64C 3/10; B64C 1/069; B64C 39/12; B64C 3/52; B64C 7/00; B64C 3/546; B64C 3/54; B64C 3/40; B64C 3/38; B64C 3/12; B64C 1/26; Y02T 50/145; Y02T 50/12; F42B 10/14

USPC ........ 244/2, 3.27, 3.28, 45 R, 46, 49, 117 R, 244/131; 446/435, 34, 61, 66
See application file for complete search history.

(56) References Cited

U.S. PATENT DOCUMENTS

| | | | | |
|---|---|---|---|---|
| 1,998,148 A | * | 4/1935 | Vieriu | 244/49 |
| 2,573,271 A | * | 10/1951 | Perl | 244/2 |
| 3,285,540 A | * | 11/1966 | Lee | B64C 3/38 |
| | | | | 244/131 |

(Continued)

OTHER PUBLICATIONS

"Serenity Blueprint Reference Pack," Endo/Exo-Atmospheric Shuttle on p. 10 sheet 8; published by QMx Feb. 2008; www.quantummechanix.com; http://www.qmxonline.com/.*

(Continued)

*Primary Examiner* — Richard R. Green
(74) *Attorney, Agent, or Firm* — Hauptman Ham, LLP

(57) ABSTRACT

A truss for a flying vehicle supports a pair of wings in a manner which facilitates pivoting of the wings between a deployed configuration and a retracted configuration. The truss includes parallel top and bottom plates with the gap therebetween. The wings have wing brackets affixed thereto with the wing brackets pivotably supported by hinge assemblies to the top plate and bottom plate of the truss. Latch assemblies can be selectively actuated to secure the wing brackets and associated wings to the truss in either the deployed configuration or the retracted configuration, so that loads between the wings and the truss are primarily carried through the latch assemblies rather than through the hinge assemblies. A hinge position on the truss and on the wing brackets is selected to maximize wing length tip to tip while minimizing an outline required for the vehicle when the wings are fully retracted.

11 Claims, 7 Drawing Sheets

(56) References Cited

U.S. PATENT DOCUMENTS

| | | | | |
|---|---|---|---|---|
| 3,405,280 | A | * | 10/1968 | Willox ............... B64C 3/40 |
| | | | | 244/46 |
| 3,489,375 | A | * | 1/1970 | Tracy ........................ 244/46 |
| 3,642,234 | A | * | 2/1972 | Kamber ........... B64C 1/0009 |
| | | | | 222/146.1 |
| 3,881,671 | A | * | 5/1975 | Bouchnik .................. 244/140 |
| 4,915,664 | A | * | 4/1990 | Bakker ........................ 446/62 |
| 5,899,410 | A | * | 5/1999 | Garrett ...................... 244/45 R |
| 5,984,231 | A | * | 11/1999 | Gerhardt et al. ............ 244/46 |
| 6,073,882 | A | * | 6/2000 | Zieger ......................... 244/49 |
| 6,202,958 | B1 | * | 3/2001 | Dommer et al. ........ 244/3.28 |
| 2007/0125904 | A1 | * | 6/2007 | Janka ...................... 244/3.28 |
| 2009/0302151 | A1 | * | 12/2009 | Holmes ....................... 244/49 |

OTHER PUBLICATIONS

Image, Samson Sky, Oshkosh, Wisconsin, 2009.
Image, Samson Sky, Jul. 2009.

* cited by examiner

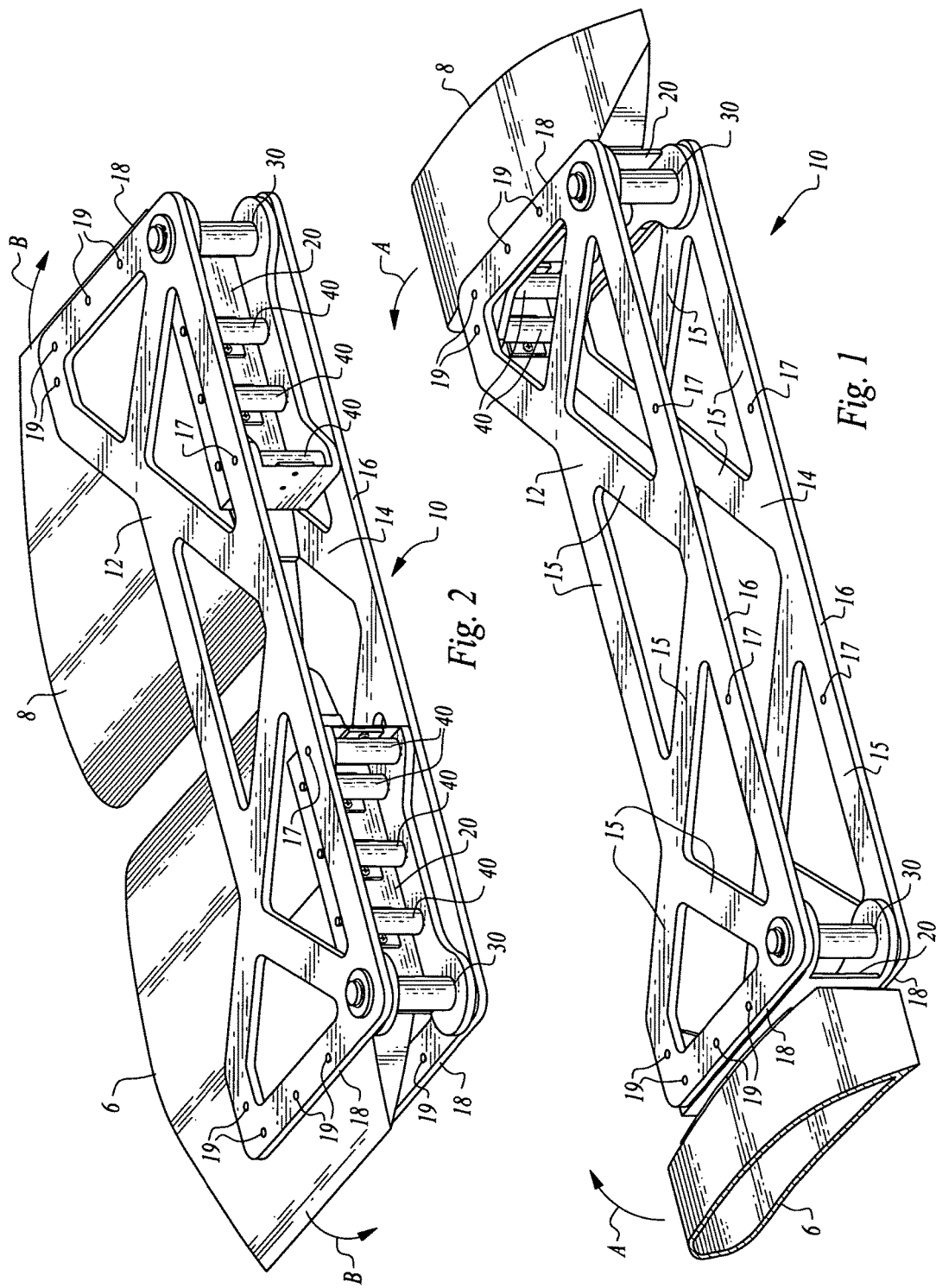

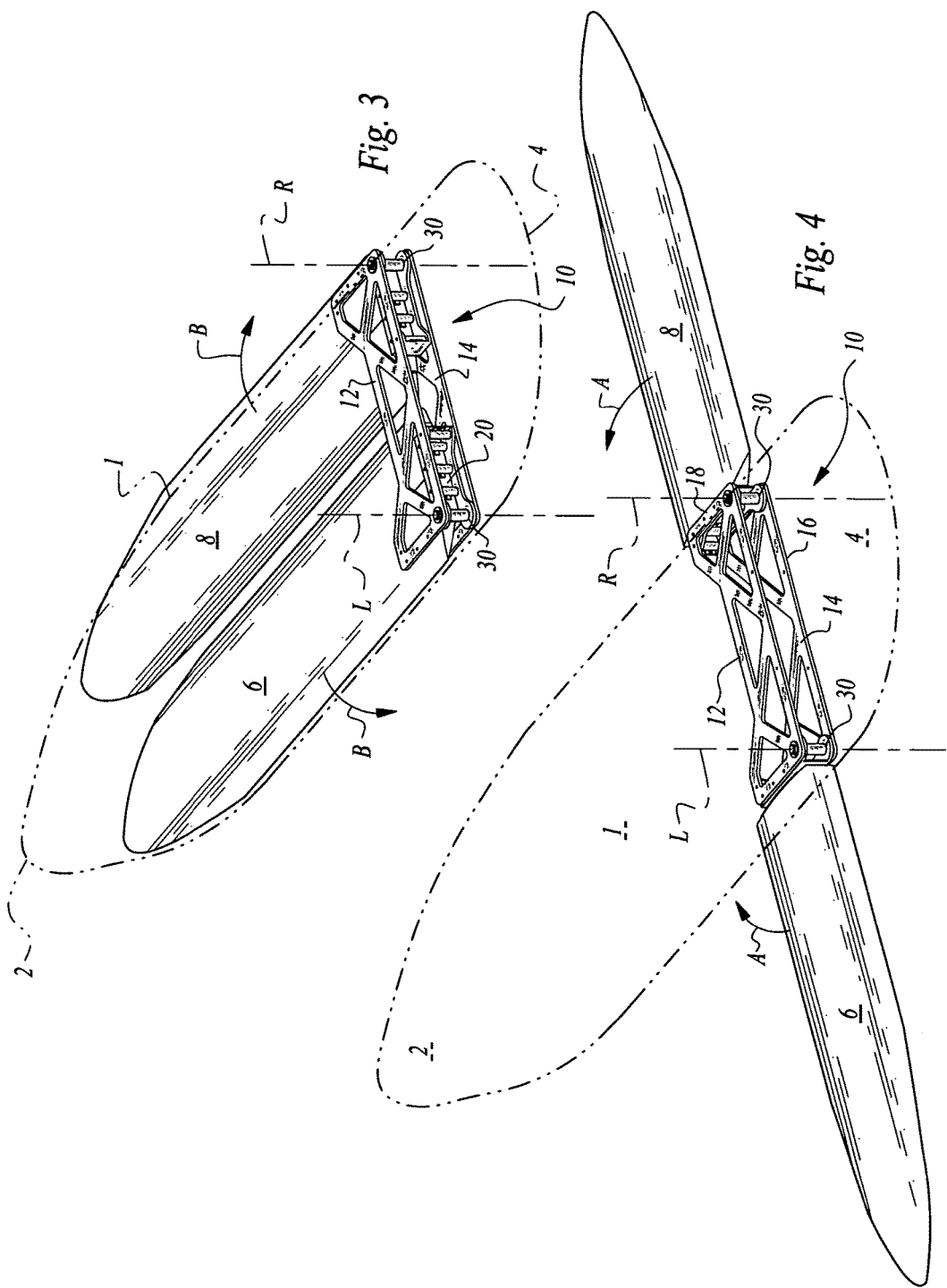

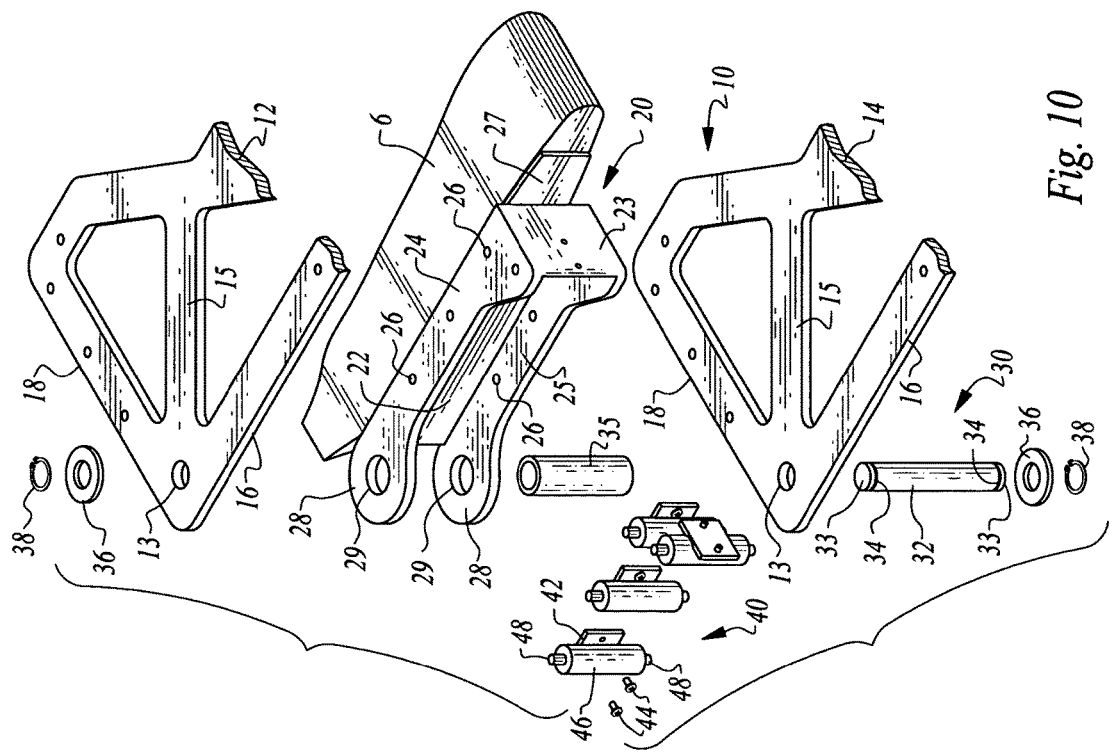
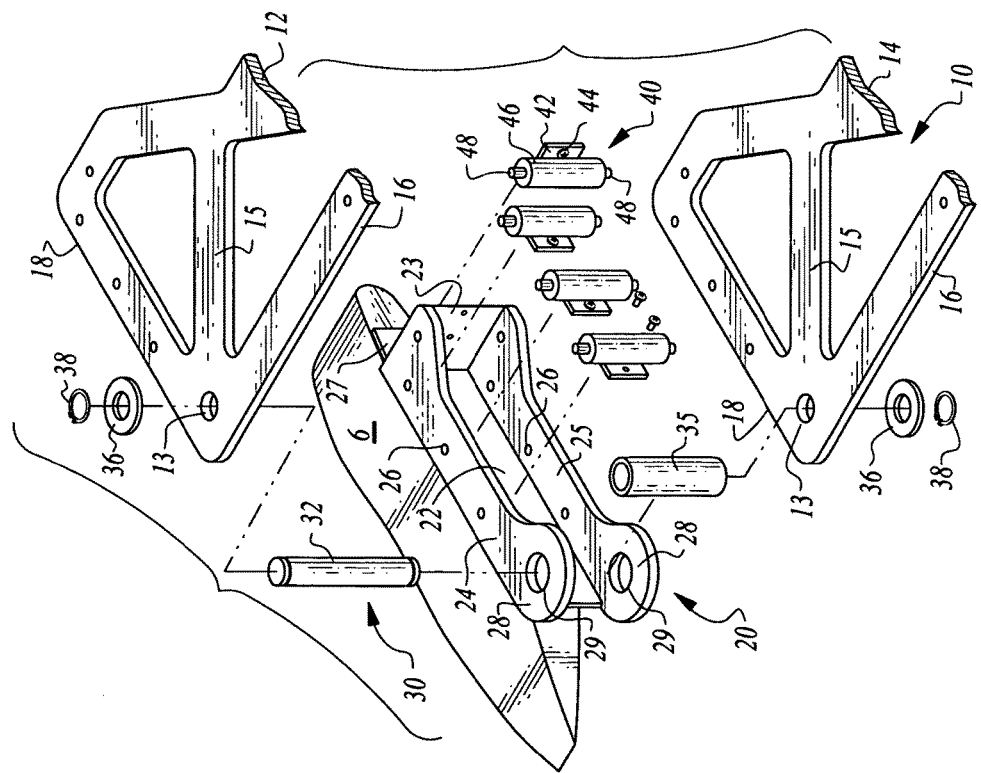
Fig. 10
Fig. 9

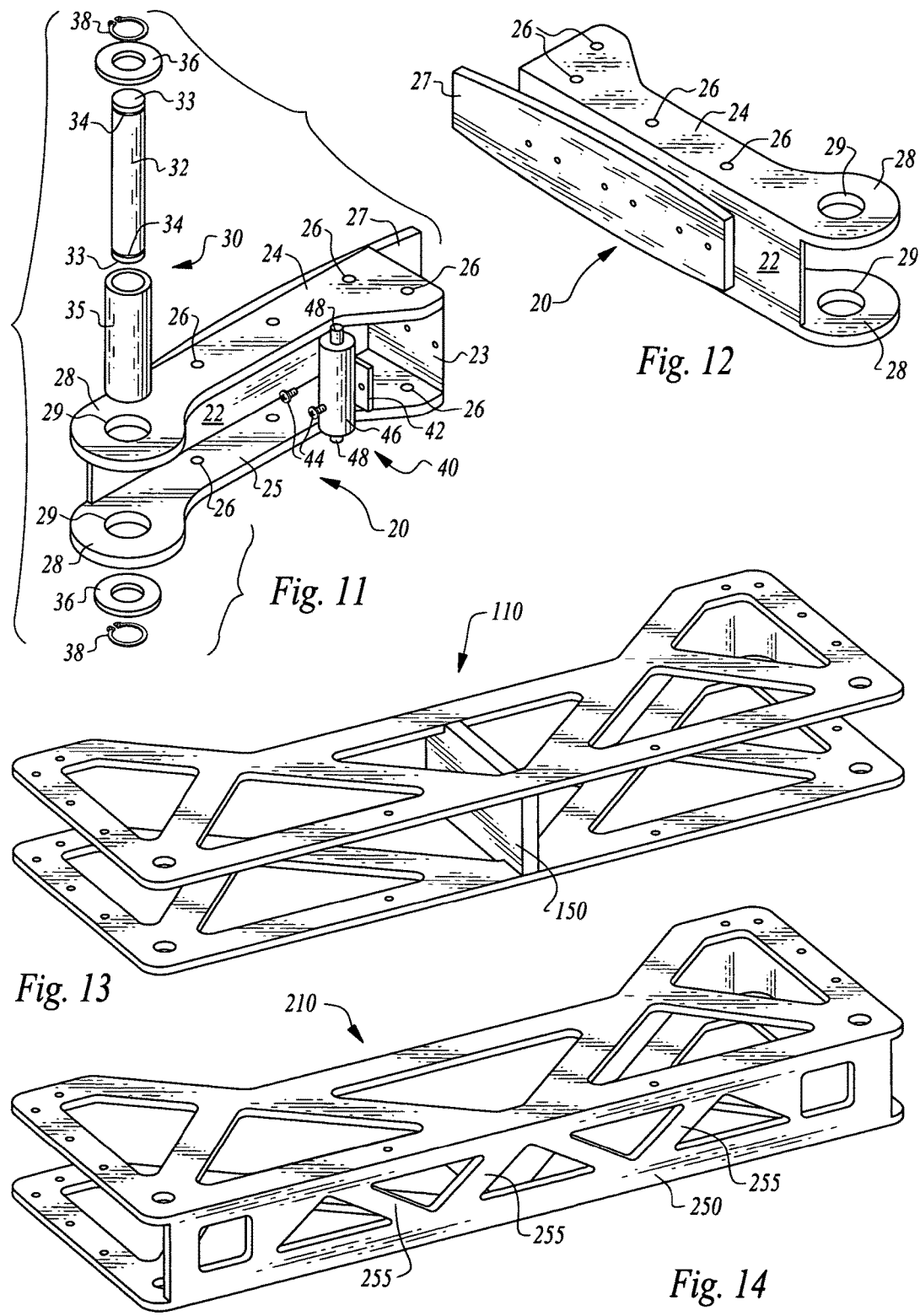

FLYING VEHICLE RETRACTABLE WING HINGE AND TRUSS

CROSS-REFERENCE TO RELATED APPLICATIONS

This application claims benefit under Title 35, U.S. Code § 119(e) of U.S. Provisional Application No. 61/400,896 filed on Aug. 3, 2010.

FIELD OF THE INVENTION

The following invention relates to flying vehicles and particularly airplane type vehicles with a fixed wing when in flight. More particularly, this invention relates to aircraft exhibiting a fixed wing when in flight which can have the wings move from a deployed position to a retracted position when the wings are not in use, such as to facilitate use of the vehicle as a road vehicle.

BACKGROUND OF THE INVENTION

Although flying automobiles have captured the imagination for generations, a viable flying car has not been successfully introduced. At present, although construction and materials have reduced automobile weight, automotive safety and smog regulations require a car to be heavier than a similarly sized aircraft. It seems a daunting task to produce an automobile that also has suitable qualities for flight. Motorcycle construction and weight is a more suitable match for a flying vehicle or combined land/air vehicle, hence the three-wheel approach described herein.

While driving on the ground, wings are detrimental. The wings produce lift when such lift undesirably destabilizes the land vehicle. The wings are highly subject to damage. Also, land vehicle traffic lanes on roads are too narrow to accommodate winged vehicles. Thus, it is desirable to have the wings transition between a deployed flight position and a retracted land travel position. Numerous examples exist of hinged wings, especially for aircraft storage. Many such designs date from aircraft carrier operations during World War II. An example would be the U.S. Navy Corsair.

Additional examples have shown up in military and non-military aircraft since that time, including the F-111, Tomcat and the Terrafugia. While the Tomcat and F-111 were swinging wings, the Corsair and Terrafugia were folding wings. Each have hinge mechanisms that take significant loads from the wing during flight, and consequently have to be very robust. Even with this, there are maintenance issues with the swing wings of the F-111 and the Tomcat.

The present invention describes a wing hinge mechanism that allows a wing to swing out from a retracted position to a deployed position, but then has features that allow the main forces of the wing loading to bypass the hinge while in flight. This keeps the hinge fairly small and light, which is important to flying vehicles, and prevents the extra maintenance of hinges that suffer wing load conditions during normal use.

SUMMARY OF THE INVENTION

With this invention a vehicle configuration is provided which has a pair of wings which pivot about hinges relative to a central truss built into a frame of the vehicle. While the vehicle could be any form of flying vehicle which would benefit from having retractable wings in certain circumstances, the preferred embodiment is in the form of a vehicle convertible between a flying mode and a driving mode when it is configured as a three-wheeled vehicle (i.e. a motorcycle).

The hinged wing structure generally includes a central truss, a left hinge, a right hinge and wing brackets associated with a left wing and right wing. In this embodiment, the truss is generally in the form of two substantially parallel plates. Each plate is formed of separate ribs as structural members to transmit tension and compression loads throughout the truss. A primary goal of the truss is to have wing loads transmitted directly from the wings to the truss rather than having significant loads transmitted through the hinges. In this way, a size and robustness of the hinges and structure of the truss directly adjacent the hinges can be optimized.

Another important feature of the hinged wing mechanism is to facilitate the wings being as long as possible extending in a lateral direction when in a deployed position, but minimizing a length of the wings which needs to be stored when in the stored position, such that the wings can fit entirely within an overall outline of an outer shell of the vehicle and keep the vehicle a minimum size. To accommodate such length optimization, the hinge point is preferably provided at outermost rear portions of the left and right lateral edges of the central truss. In such a configuration, the chord width of the wings is accommodated inboard of the hinge points. The wings can thus extend out laterally and an overall width of the vehicle from wing tip to wing tip is substantially similar to an entire length of the left wing plus an entire length of the right wing plus an entire length of the central truss. When stored, the length of the entire assembly including the left wing, right wing and central truss is substantially the same as only the length of the left wing (or the right wing) from tip to hinge. As an example, if the truss is five feet wide and each wing has a chord width of 2.5 feet and a length of 12.5 feet, the tip-to-tip width of the pair of wings is thirty feet while the wings collapse into a stored package of 12.5 feet, which can be stored within the vehicle body's outline.

A vehicle is thus provided which has wings which can transition between a deployed position and a collapsed position and which vehicle when its wings are in the collapsed position can fit within a standard parking spot, such as with an overall length of the vehicle of approximately twenty feet or less. However, when the wings are deployed, the wings have sufficient length and other size characteristics that they can provide the lift required for a vehicle of this size and for a payload such as a pair of passengers of typical weight and a small amount of associated cargo, similar to that typically found in two seat general aviation aircraft.

The portion of each hinge which connects to the wings preferably interfaces with a wing bracket coupled to each wing at ends thereof opposite the tips. These wing brackets and portions of the wings adjacent thereto fit inboard of the two parallel plates of the central truss. These wing brackets are made of separate elements from the truss which are configured to transmit loads effectively from the wing into the central truss. These loads include lift loads which act vertically, and counteract gravity loads which also act vertically.

Other loads through this hinge joint include drag loads and vehicle propulsion system acceleration loads which generally act in a fore and aft direction. Other loads, such as those induced by turbulence or the performance of aerobatic maneuvers can act in other directions and be either linear loads or twisting loads about different rotational axes, and are all effectively transmitted from the wings to the wing brackets and then to the central truss with a minimum of loading and associated strain on the actual hinge joints themselves. The wing brackets can extend laterally into an interior of an outer aerodynamic surface of an associated wing if desired to effectively carry loads from the wing to the wing bracket.

A latching mechanism is also provided which is configured to lock an embodiment of this invention between a wing open position and a wing closed/stored position. An actuator can optionally be provided to adjust the latches to engage holes or other structures between the wing brackets and the truss. In the exemplary embodiment shown, the latches are provided as a set of four which are fixed to the wing brackets and adjustably engage and disengage the truss at two separate locations for secure attachment in a deployed or a retracted wing configuration. The latches are spaced from the hinge to minimize stress on the hinge and provided as a set to distribute loads evenly to the truss without stress concentration.

OBJECTS OF THE INVENTION

Accordingly, a primary object of the present invention is to provide a wing hinge and truss that swings a wing partially or wholly away from the body for deployment of the wing or into the body of the vehicle for retraction of the wing.

Another object of the invention is to swing a wing away from the body and be able to lock the wing to the body in a fashion that transfers the wing loading to the vehicle and away from the hinge to a large degree.

Another object of the invention is to provide a retractable wing which has increased wing span over existing state of the art swinging wings.

Another object of the present invention is to provide a method and apparatus for transferring loads from a wing to a central truss of a vehicle.

Another object of the present invention is to provide a hinged wing which hinge has a minimum of wing loads acting thereupon.

Another object of the present invention is to provide a vehicle which can have a wing transition from a deployed to a retracted configuration quickly, easily and reliably.

Other further objects of the present invention will become apparent from a careful reading of the included drawing figures, the claims and detailed description of the invention.

BRIEF DESCRIPTION OF THE DRAWINGS

FIG. 1 is a perspective view of a truss of this invention for secure mounting of wings in a pivotable fashion to a flying vehicle, with the wings shown in a deployed configuration.

FIG. 2 is a perspective view similar to that which is shown in FIG. 1, but with the wings shown in a retracted position.

FIG. 3 is a perspective view similar to that which is shown in FIG. 2, but also showing a general outline of a flying vehicle and illustrating how the wings can be completely retracted within an outline of the vehicle.

FIG. 4 is a perspective view similar to that which is shown in FIG. 3, but with the wings deployed.

FIG. 9 is an exploded parts view of the left end of the truss of FIG. 1 and portions of the left wing, shown in perspective and illustrating various parts comprising the wing brackets, hinge assemblies and latch assemblies which pivotably attach and secure the left wing to the truss left lateral edge, and with the wing shown in a deployed orientation.

FIG. 10 is a perspective exploded parts view similar to that which is shown in FIG. 9, but with the wing retracted.

FIG. 11 is a perspective view of a wing bracket portion of this invention shown with a hinge assembly of this invention exploded from the wing bracket.

FIG. 12 is a perspective view of the wing bracket shown alone and from a reverse angle of that depicted in FIG. 11.

FIG. 13 is a perspective view of an alternative embodiment truss of that which is shown in FIG. 1, including a center plate for joining a top plate and bottom plate of the truss together.

FIG. 14 is a perspective view of a further alternative embodiment truss of that which is shown in FIG. 1, and featuring a rear plate for joining the top plate and bottom plate of the truss together.

DESCRIPTION OF THE PREFERRED EMBODIMENT

Figure 5:
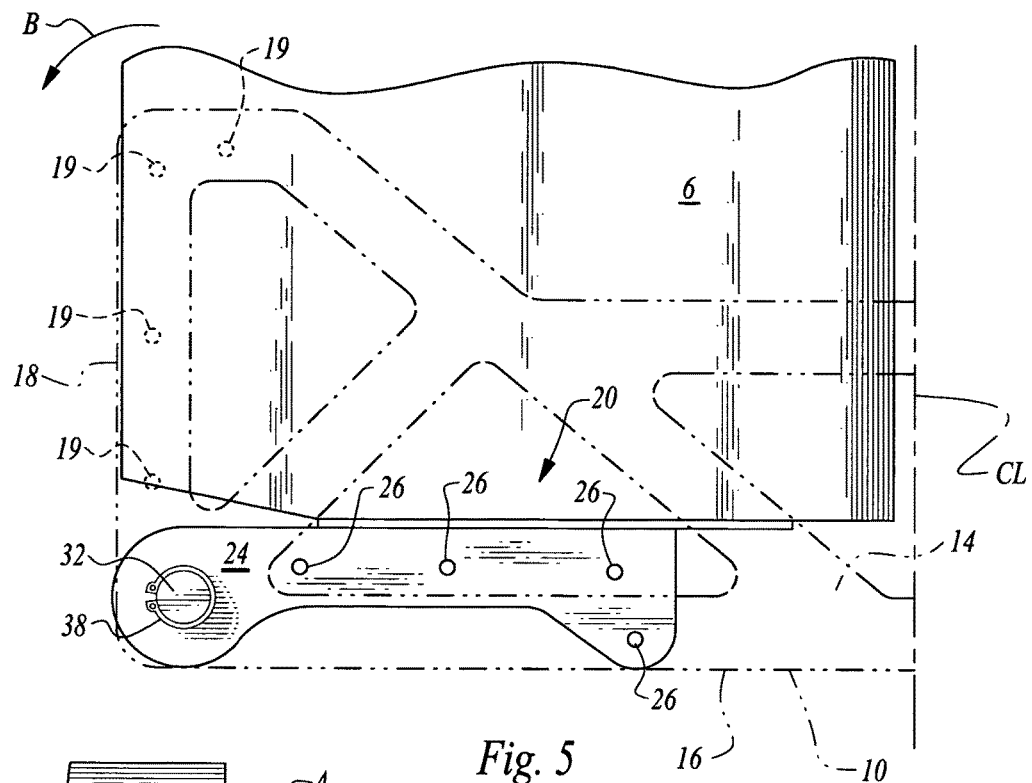
FIG. 5 is a top plan view of a left end of the truss of FIGS. 1 and 2 and portions of the left wing pivotably attached to the truss, and with the wings shown in a retracted orientation relative to the truss, and with truss portions shown in broken lines.
Figure 6:
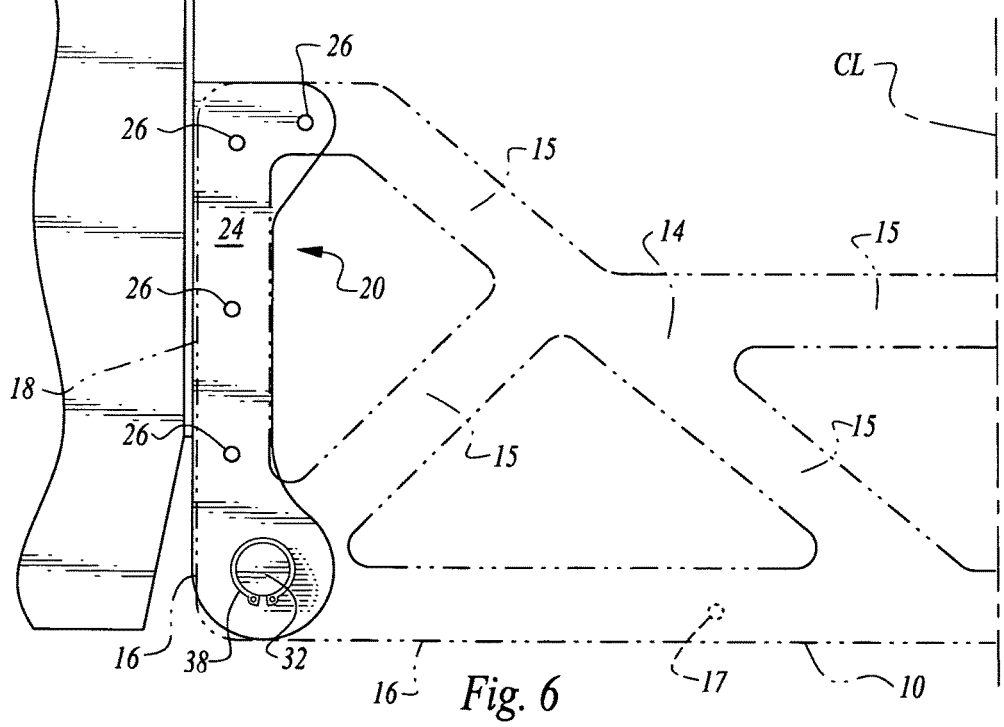
FIG. 6 is a top plan view similar to that which is shown in FIG. 5 but with the wing in a deployed orientation.
Figure 7:
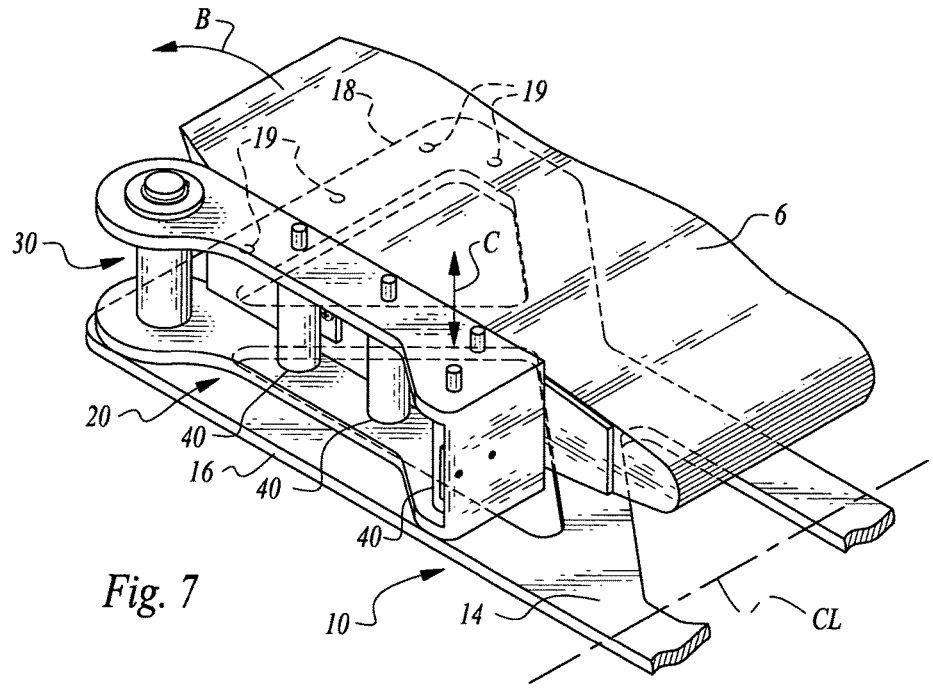
FIG. 7 is a perspective view of that which is shown in FIG. 5, with both truss and wing structures shown in solid lines (except where structures are hidden and then shown with hidden lines), and with a top plate of the truss removed to better illustrate details of a wing bracket and hinge assembly, as well as latch assemblies for joining, facilitating pivoting and securing the left wing to the left lateral edge of the truss.
Figure 8:
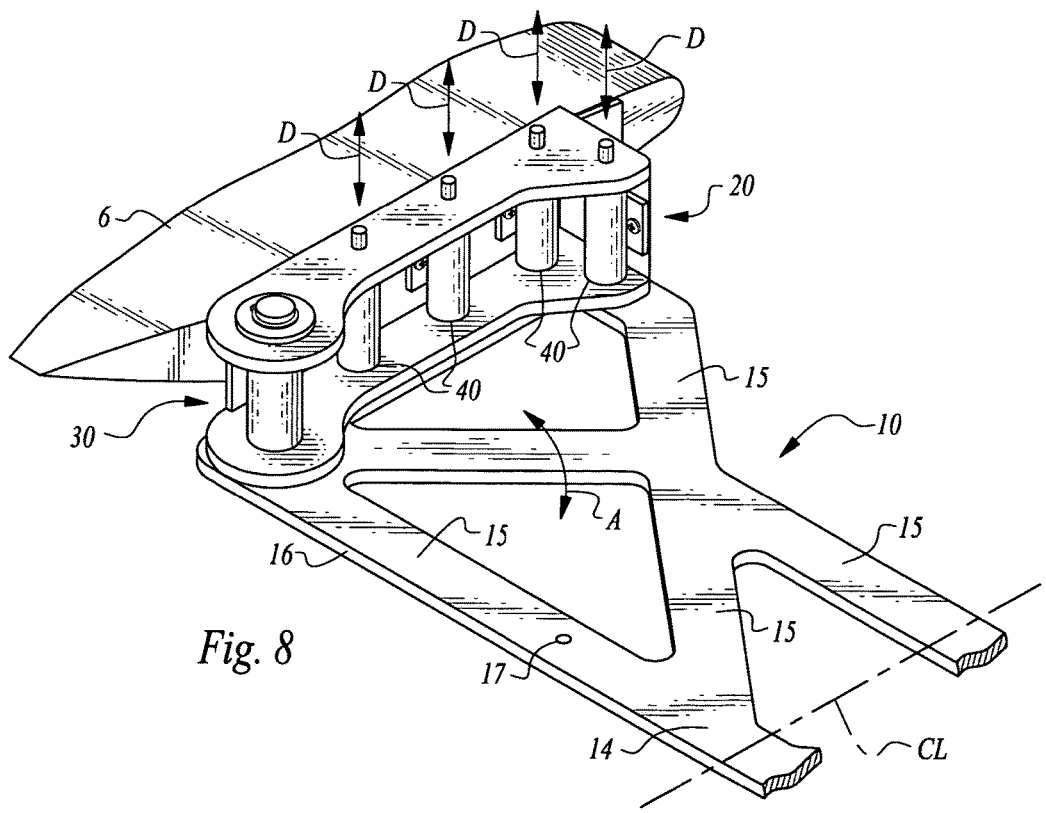
FIG. 8 is a perspective view similar to that which is shown in FIG. 7, but with the wing in a deployed configuration.

Referring to the drawings, wherein like reference numerals represent like parts throughout the various drawing figures, reference numeral 10 (FIGS. 1-4) is directed to a truss which pivotably supports a left wing 6 and right wing 8 of a flying vehicle 1. The truss 10 carries loads from the wings 6, 8 to a frame and body of the vehicle 1 when the wings are deployed. In addition, the truss 10 facilitates pivoting of the wings 6, 8 relative to the truss 10 and associated body of the vehicle 1, when the wings 6, 8 are to be retracted, such as to allow the vehicle 1 to operate as a wingless road vehicle in one mode of operation.

In essence, and with particular reference to FIGS. 1 and 2, basic details of the truss 10 and associated structures for joining the wings 6, 8 to the truss 10, are described, according to an exemplary embodiment. The truss 10 includes at least one plate and typically a pair of plates including a top plate 12 and bottom plate 14 spaced from each other by a gap therebetween. Each wing 6, 8 has a wing bracket 20 secured to a portion of each wing 6, 8 adjacent the truss 10. These wing brackets 20 interface with a pair of hinge assemblies 30 which allow the wing brackets 20 and associated wings 6, 8 to pivot relative to the truss 10. Separate latch assemblies 40 are also provided which removably attach and secure the wing brackets 20 to the truss 10 so that a majority of loads between the wings 6, 8 and the truss 10 are not carried by the hinge assemblies 30, but rather carried by the latch assemblies 40 directly from the wing brackets 20 to the truss 10, and over to other portions of the vehicle.

Figure 15:
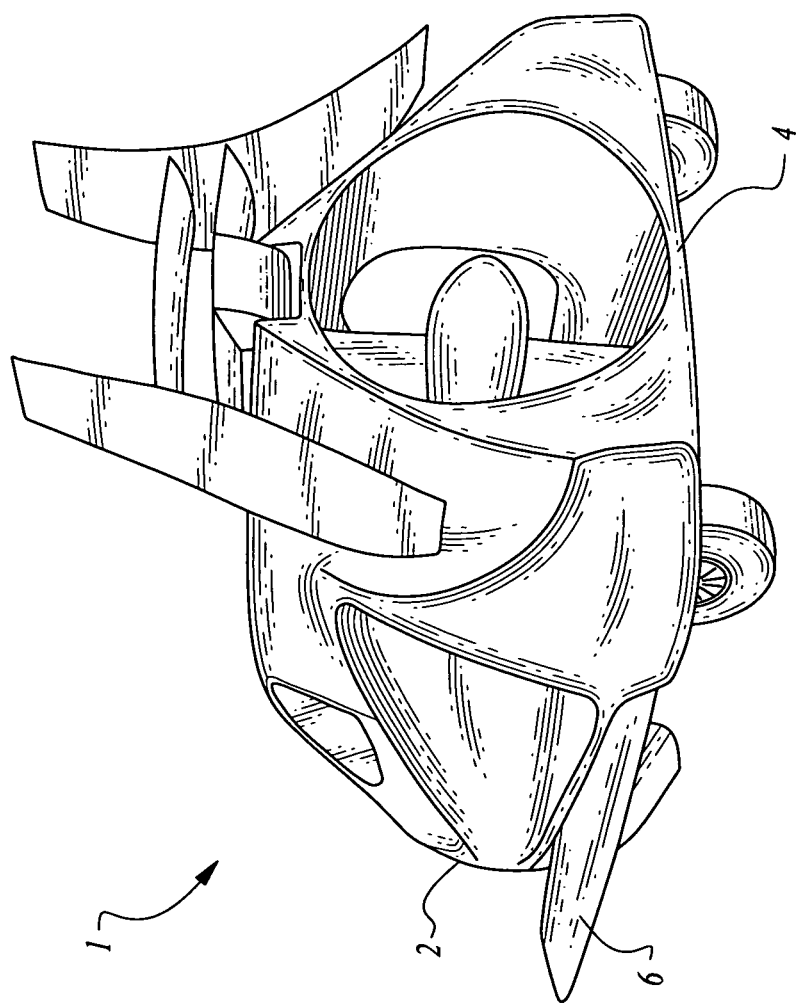
FIG. 15 is a perspective view of a vehicle with which the truss and wings of invention embodiments depicted herein can be utilized.

More specifically, and with particular reference to FIGS. 3, 4 and 15, basic details of an exemplary vehicle 1 with which the truss 10 of this invention and associated wings 6, 8 can be utilized, are described according this exemplary embodiment. The vehicle 1 includes a fore 2 opposite an aft 4. The truss 10 is oriented with lateral edges 18 defining a lateral extent of the truss 10 transverse to a centerline CL (FIGS. 5-8) of the vehicle 1 extending from the fore 2 end of the vehicle 1 to the aft 4 end of the vehicle 1.

While the vehicle 1 can have a variety of different configurations, in a preferred embodiment an engine provides motive force for the vehicle and is located adjacent the aft 4 of the vehicle 1. The fore 2 of the vehicle 1 defines a nose of the vehicle 1 which includes compartments within which the wings 6, 8 can be stored when in their retracted position, such as when the vehicle 1 is to be driven on a road. The vehicle 1 typically includes wheels suitable for allowing the vehicle 1 to be driven on roads, with these wheels typically including a pair of wheels at the aft 4 and a single central wheel at the fore 2. The vehicle 1 has a width greater than twice a chord length of the wings so that the wings 6, 8 can reside adjacent each other and fit entirely within an outline of the vehicle 1. Alternatively, the wings 6, 8 could slightly overlap each other when retracted, or the wings 6, 8 could protrude slightly from the outline of the vehicle 1, in less than optimal embodiments of the invention.

The vehicle 1 would also typically include control surfaces including a rudder and vertical stabilizer which are preferably located on a tail assembly adjacent the aft 4 of the vehicle 1. This tail assembly can be telescopically deployed substantially horizontally rearwardly (and optionally also upwardly) from the aft 4 in one embodiment of the invention. Preferably, doors cover the wings 6, 8 when they are retracted into an outline of the vehicle 1. These doors can be pivoting doors which automatically pivot open and closed relative to motion of the wings 6, 8, or can otherwise be manually or automatically opened and closed. A cabin for the vehicle would also typically be provided on a portion of the vehicle between the fore 2 and the aft 4, and typically above and just forward of the truss 10.

With particular reference to FIGS. 1 and 2, basic details of the truss 10 are described, according to this exemplary embodiment. The truss 10 is a rigid structure providing a general function of pivotably attaching the wings 6, 8 to the vehicle 1 and transferring loads from the wings 6, 8 to the vehicle 1 in a manner where a majority of these loads are transferred through structures other than the hinge assemblies 30, and most preferably in the form of wing brackets 20 and latch assemblies 40 spaced from the hinges 30. In this exemplary embodiment, the truss 10 includes a substantially planar top plate 12 substantially parallel to and spaced from a substantially planar bottom plate 14. Each plate 12, 14 has rear edges 16 defining an overall rear edge of the truss 10. These rear edges 16 can be fixed together, such as by a rear truss plate (see FIG. 14). Each of the plates 12, 14 also include lateral edges 18 at left and right lateral edges 18 of the plates 12, 14. These lateral edges 19 are spaced apart by a distance defining a width of the truss 10. This width is preferably similar to twice a chord width for the wings.

The plates 12, 14 each include hinge holes 13 passing therethrough which can receive portions of the hinge assemblies 30 therethrough. The plates 12, 14 most preferably include a plurality of ribs 15 and openings. The ribs 15 provide structural strength to the plates 12, 14 while the openings minimize an overall weight of the truss 10. A pattern for these ribs 15 can vary, but is most preferably akin to the pattern depicted in FIGS. 1 and 2. The plates 12, 14 are spaced apart by a gap height similar to but greater than a wing 6, 8 thickness, so that the wings 6, 8 can be retracted at least partially into this gap.

The plates 12, 14 preferably include rear holes 17 adjacent the rear edges 16 and lateral holes 19 adjacent the lateral edges 18. The rear holes 17 are preferably provided as a single hole in the top plate 12 and a single hole in the bottom plate 14 for each lateral side of the plates 12, 14 on opposite sides of the centerline CL (FIGS. 5-8). In contrast, a larger number of lateral holes 19 are preferably provided in the top plate 12 and bottom plate 14 adjacent the lateral edges 18 thereof. In a most preferred embodiment, four such lateral holes 19 are provided in each plate 12, 14 adjacent each lateral edge 18.

The singular rear hole 17 pair interact with the latch assembly 40 to keep the wings 6, 8 in their retracted position. Because forces on the wings 6, 8 are rather low when the wings are in their retracted position, only one pair of rear holes 17 is required in the plates 12, 14 to keep the wings 6, 8 in the retracted position for this embodiment. In contrast, a larger number, and preferably four lateral holes 19 are provided in each of the plates 12, 14 at each lateral edge of the plates 12, 14 of the truss 10. These lateral holes 19 each interface with separate latch assemblies 40 and also with latch holes 26 in wing brackets 20 so that actuatable posts 48 of the latch assemblies 40 extend through these holes 26 and into the lateral holes 19 to secure the wings 6, 8 to the truss 10 through these latch assemblies 40, rather than through the hinge assemblies 30.

By providing a larger number of lateral holes 19 and spacing these lateral holes 19 from the hinge holes 13, the wings 6, 8 can have deployed flight loads transferred to the truss 10 at a variety of separate points. Not only are these separate points separate from each other to avoid stress concentrations, but also are spaced from the hinge assembly 30. By providing multiple such lateral holes 19, and multiple associated latch assemblies 40, loads are distributed so that each latch assembly 40 need not be as robust while still providing redundant latching reliability. With the spacing away from the hinge holes 13, forces are carried at locations spaced from the hinge assemblies 30 so that a minimum of forces are transferred through the hinge assemblies 30 from the wings 6, 8 to the truss 10.

With particular reference to FIGS. 9-12, basic details of the wing brackets 20 and hinge assemblies 30 are described, according to a most preferred embodiment. The wing brackets 20 define portions of each wing 6, 8 which are securely affixed to the wings 6, 8 and pivotably attachable to the truss 10. These brackets 20 thus provide at least a portion of a means to pivotably couple the wings 6, 8 to the truss 10 and onto the frame of the vehicle 1. The drawing figures depict in detail a left one of a pair of wing brackets 20 for use with the left wing 6. A corresponding wing bracket would also be provided for the right wing which would be a mirror image of the wing bracket 20.

The wing bracket 20 is a rigid structure which is configured so that it can be securely affixed to the left wing 6. This wing bracket 20 can be incorporated into the wing 6, or be a separate structure attachable to the wing 6. In this embodiment, the wing bracket 20 is separate from the left wing 6 but securely affixed to the left wing 6. The wing bracket 20 includes a base plate 22 oriented substantially perpendicular to an end plate 23 and with an upper plate 24 and lower plate 25 spaced apart by a width of the base plate 22 and end plate 23 and with the upper plate 24 and lower plate 25 generally parallel with each other.

A contour of these upper and lower plates 24, 25 is preferably similar to that depicted in the drawing figures, and having a height similar to a thickness of the wings 6, 8 so that the wing brackets 20 can fit within the gap between the plates 12, 14 of the truss 10. The wing brackets 20 are configured with the upper plate 24 and the lower plate 25 having a specific geometry which facilitates the providing of a large number of latch holes 26 thereon, and not entirely within a line but rather with at least one of the latch holes 26 at an end most distant from the hinge assembly 30 being outside of the plane in which the other three latch holes 26 are provided.

Preferably, an interface plate 27 is provided adjacent to the base plate 22 which provides a separate structure which can be attached to the wing brackets 20 and portions of the wing 6 to distribute loads and secure the left wing 6 to the wing bracket 20. The upper and lower plates 24, 25 each include pivot lobes 28 at one end thereof with an eye 29 passing through each pivot lobe 28. This eye 29 of each plate 12, 14 defines a cylindrical recess in which a pintle 32 of the hinge assembly 30 can be placed. The pintle 32 preferably includes ends 33 with grooves 34 adjacent thereto. A sleeve 35 can ride over an outer surface of the pintle 32 and provide a standoff function keeping the plates 12, 14 of the truss 10 from coming too close together and blocking the motion of the wings 6, 8 into and out of the gap between the plates 12, 14.

The hinge 30 assembly includes the eye 29 formed within each pivot lobe 28. This eye 29 receives the pintle 32 passing substantially vertically therethrough. Ends 33 of the pintle 32 preferably include horizontal grooves 34 which can receive lock rings 38 therein. Washers 36 can also be located between the lock rings 38 and the pivot lobes 28 to complete the construction of each hinge assembly 30. The sleeve 35 surrounds the pintle 32 between the plates 12, 14 of the truss 10. This simple hinge assembly 30 is preferably kept simple by having wing loads between the wings 6, 8 and the truss 10 transferred through latch assemblies 40 rather than through the hinge assemblies 30.

The wings 6, 8 pivot about associated substantially vertical axes passing through the pintles 32 of each hinge assembly 30. While substantially vertical, the pivot axes are preferably actually canted inward and forward slightly so that the wings 6, 8 exhibit some dihedral (or anhedral) when deployed, yet be horizontal when retracted. In one embodiment, this substantially vertical but slightly canted orientation is six to eight degrees off of vertical inward (toward each other) and six to eight degrees off of vertical forward to accommodate a six to eight degree dihedral for the wings 6, 8.

With particular reference to FIGS. 9-11, specific details of the latch assemblies 40 are described, according to this exemplary embodiment. The latch assemblies 40 while they could be integrated together, are in this embodiment separate isolated structures which are positioned to selectively latch the wing brackets 20 and associated wings 6, 8 to portions of the truss 10. Each latch assembly 40 includes a mounting plate 42 which in this embodiment is configured to allow the latch assemblies 40 to be attached through fasteners 44 to the wing brackets 20, and most particularly to the base plate 22 of the wing brackets 20.

Each latch assembly 40 includes a cylindrical body 46 which extends substantially vertically and has a height similar to a distance between the upper plate 24 and lower plate 25 of the wing brackets 20. These latch assemblies 40 are positioned directly aligned with the latch holes 26 in the wing brackets 20.

Actuated posts 48 extend from upper and lower ends of the cylindrical body 46 and through the latch holes 26 in the wing brackets 20. The posts 48 move up and down (along arrows C and D of FIGS. 7 and 8). Such motion can be manual or automatic. If automatic, in one embodiment the cylindrical bodies 46 are configured as solenoids. When an appropriate electric signal is delivered to the assemblies, the posts are caused to move up or down depending on whether the latch assemblies are to be engaged or disengaged. As an alternative, the latch assemblies could be manually actuated, with such manual actuation occurring through sliding of a lever or other mechanism associated with the posts 48.

If required, force assistance for movement of the posts 48 could be provided by a spring or other element for adding force to movement of the posts 48. These posts 48 move up into holes in the truss 10, including lateral holes 19 or the rear holes 17. The lateral holes 19 are engaged by the posts 48 when the wings 6, 8 are secured in their deployed configuration. Preferably, all four posts 48 are used to engage portions of the wing brackets 20 to the lateral edges 18 of the truss 10 through the lateral holes 19 in the plates 12, 14. When the wings are in their retracted position, only one of the posts 48 is used and moved to engage the rear holes 17 in the truss 10 for securing the wings 6, 8 in their retracted position. Optionally, the rear holes 17 could be omitted and the wings 6, 8 secured in their retracted position by structures near the fore 2 that engage the tips of the wings 6, 8 or elsewhere, as the wings 6, 8 do not encounter high loads when retracted.

If desired, sensors can be associated with the posts 48 and latch assemblies 40 generally, which sensors ensure that the posts 48 have entirely engaged holes in the truss 10 to ensure that the wings 6, 8 have been adequately locked in their deployed position to the truss 10. This system can be integrated with lights on a display within the cockpit which indicate the status of the latch assembly 40.

These posts can be perfectly cylindrical if desired. Tolerance can be provided to allow the posts 48 to fit within the holes in the truss 10, including the rear holes 17 and lateral holes 19. As another alternative, the posts 48 can have some degree of taper so that the posts 48 can extend until an interference with surfaces of the lateral holes 19 or rear holes 17 occurs. With such a taper, no tolerance is required and a secure fit is always achieved. Some combination of tolerancing and geometric configuration of the posts 48 can be appropriately selected to optimize secure attachment and convenient movement of the posts 48 to achieve the benefits of secure attachment and the benefits of convenient movement of the posts 48.

FIG. 13 depicts an alternative truss 110 which is similar to the truss 10 of FIGS. 1-4 except that it uniquely includes a center plate 150 joining the top plate 12 and bottom plate 14 together. Such a center plate 150 adds stiffness to the truss 110 and can be added to the truss 10 if desired. The plate 150 is positioned along the centerline to keep open the gap in the truss for wing 6, 8 positioning therein.

FIG. 14 depicts an alternative truss 210 which uniquely includes a rear plate 250 joining rear edges of the truss 210 together. This rear plate 250 features ribs 255 in this embodiment which supply a strength to this rear plate 250 while minimizing weight.

The center plate 150 of the alternative truss 110 (FIG. 15) could be combined with the alternative truss 210 and associated rear plate 250 and with these structures integrated into the truss 10 of FIGS. 1-4 in one form of the invention, so that the plates 12, 14 of the truss 10 can be securely held together and kept from distorting while carrying the loads between the wings 6, 8 and a frame of the vehicle 1 to which the truss 10 is attached. Such frame attachment between the truss 10 and the vehicle 1 can occur on a variety of different portions of the truss 10, provided that they avoid interference with motion of the wings 6, 8. In one embodiment, the truss 10 is integrated into the overall frame of the vehicle, rather than as a separate structure.

From a geometric standpoint, the truss 10 has plan form dimensions that are generally twice as wide as the chord length of the wings 6, 8. In this way the wings 6, 8 can fit inside the gap when the wings 6, 8 are retracted. The truss 10 has a height similar to a thickness of the wings 6, 8 so that the wings can fit within the gap. The vehicle 1 extends from the truss 10 location near a center of gravity of the vehicle 1 forward to the fore 2 a distance similar to a length of each wing 6, 8. By hinging the wings 6, 8 to the truss 10 at rear lateral corners of the truss and rear root ends of the wings 6, 8 this forward extension of the wings 6, 8 is kept to a minimum so that wing 6, 8 length can be maximized while vehicle length formed of the truss 10 can be minimized.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A combination airplane/motor vehicle arrangement, comprising:
   a vehicle body having:
      a fuselage formed with an outer shell, wherein said fuselage further comprises a pair of laterally spaced storage compartments, and
      a plurality of wheels to enable movement; and
   a pair of main wings pivotally hinged to the vehicle body in a rearward location of the associated storage compartment at laterally spaced positions for movement about a respective hinge axis between:
      a deployed position projecting outward from a longitudinal axis of the vehicle body so as to (1) both enable and (2) act as a primary lifting mechanism to sustain flight at speeds exceeding a vehicle take off speed, and
      a retracted position extending forwardly from the associated hinge axis to enable storage of the wings for travel of the vehicle body on a ground surface;
   wherein, in the retracted position, each of the pair of main wings is stored entirely within a corresponding storage compartment of the pair of laterally spaced storage compartments and thereby within an overall outline of the vehicle body defined by the outer shell as a result of the placement of the hinge axes on the fuselage.

2. The airplane/motor vehicle arrangement of claim 1, further comprising a bracket mechanism for securing each of the pair of main wings to the vehicle body in cooperation with an associated hinge such that primary wing loads are transmitted from the wing to the vehicle body through the bracket mechanism.

3. The airplane/motor vehicle arrangement of claim 1, further comprising a ducted fan located rearward of the passenger compartment for providing sufficientthrust to create lift through the deployed main wings and thereby propel the arrangement into a flight condition and sustain said arrangement in flight.

4. A combination airplane/motor vehicle arrangement, comprising:
   a vehicle body having:
      a fuselage formed with an outer shell, wherein the fuselage further comprises a passenger compartment and a pair of laterally spaced storage compartments located below the passenger compartment, and
      a plurality of wheels to enable movement; and
   a pair of main wings pivotally hinged to the vehicle body in a rearward location of the pair of laterally spaced storage compartments at laterally spaced positions for movement about a respective hinge axis between:
      a deployed position projecting outward from a longitudinal axis of the vehicle body so as to both enable and then act as a primary lifting mechanism to sustain flight at speeds exceeding a vehicle take off speed, and
      a retracted position extending forwardly from an associated hinge axis to enable storage of the wings for travel of the vehicle body on a ground surface;
   wherein, in the retracted position, the wings are stored within the associated storage compartment as a result of the placement of the hinge axes on the fuselage.

5. The airplane/motor vehicle arrangement of claim 4, further comprising a pair of doors pivotally arranged to cover the associated storage compartment when the wings are in the retracted storage position.

6. The airplane/motor vehicle arrangement of claim 4, further comprising a tail assembly having control surfaces and being pivotally secured to an aft section of the fuselage body for movement into a deployed position.

7. The airplane/motor vehicle arrangement of claim 4, wherein said plurality of wheels comprises a pair of rear wheels and a single wheel located forwardly of the rear wheels in a three wheeled configuration.

8. The airplane/motor vehicle arrangement of claim 4, further comprising a bracket mechanism for securing each wing to the vehicle body in cooperation with the associated hinge such that primary wing loads are transmitted from the wing to the vehicle body through the bracket mechanism.

9. The airplane/motor vehicle arrangement of claim 8, wherein each of the associated hinges is located outside the main wing loading path.

10. The airplane/motor vehicle arrangement of claim 4, further comprising a ducted fan located behind the passenger compartment for providing sufficient thrust to create lift through the deployed main wings and thereby propel the arrangement into a flight condition and sustain said arrangement in flight.

11. The airplane/motor vehicle arrangement of claim 4, wherein, in the retracted position, each of the pair of main wings is stored entirely within an outline of the fuselage.

* * * * *